US005152408A

United States Patent [19]

Tax et al.

[11] Patent Number: 5,152,408

[45] Date of Patent: Oct. 6, 1992

[54] CONTAINER CRANE INSTALLATION

[76] Inventors: Hans Tax, Potsdamerstr. 3, D-8000 München 40; Klaus Hösler, Emmeringer Str. 15, D-8031 Eichenau, both of Fed. Rep. of Germany

[21] Appl. No.: 731,442

[22] Filed: Jul. 17, 1991

Related U.S. Application Data

[62] Division of Ser. No. 349,248, May 8, 1989, Pat. No. 5,048,703.

[30] Foreign Application Priority Data

May 18, 1988 [DE] Fed. Rep. of Germany ....... 3816988

[51] Int. Cl.[5] ........ B65G 67/60

[52] U.S. Cl. ........ 212/270; 212/161

[58] Field of Search ........ 212/125, 146, 147, 152, 212/153, 157, 161, 213, 219, 270; 414/138.3, 139.7, 273, 140.3, 141.7; 294/81.4, 81.41; 340/685

[56] References Cited

U.S. PATENT DOCUMENTS

| | | | |
|---|---|---|---|
| 1,975,094 | 10/1934 | Fitch . | |
| 2,620,075 | 12/1952 | Hoyle et al. . | |
| 3,826,380 | 7/1974 | Lenander et al. . | |
| 3,883,859 | 5/1975 | Ancheta . | |
| 3,945,503 | 3/1976 | Cooper . | |
| 4,172,685 | 10/1979 | Nabeshima et al. | 212/153 |
| 4,363,585 | 12/1982 | Keller et al. . | |
| 4,385,028 | 5/1983 | Salaman . | |
| 4,610,594 | 9/1986 | Lane . | |
| 4,753,357 | 6/1988 | Miyoshi et al. . | |

FOREIGN PATENT DOCUMENTS

| | | |
|---|---|---|
| 1906212 | 9/1973 | Fed. Rep. of Germany . |
| 3513007 | 12/1985 | Fed. Rep. of Germany . |
| 3445830 | 6/1986 | Fed. Rep. of Germany . |
| 244120 | 3/1987 | Fed. Rep. of Germany . |
| 2265664 | 3/1974 | France . |
| 51652 | 4/1977 | Japan . |
| 538954 | 1/1978 | Japan . |
| 113153 | 9/1979 | Japan . |
| 2099255 | 12/1982 | United Kingdom . |
| 8702292 | 4/1987 | World Int. Prop. O. . |

*Primary Examiner*—Sherman D. Basinger
*Assistant Examiner*—Thomas J. Brahan
*Attorney, Agent, or Firm*—Brumbaugh, Graves, Donohue & Raymond

[57] ABSTRACT

In a container crane installation, swinging movements during the lowering of the spreader are suppressed in that the spreader, after the reaching of the ideal position of the hoist cable carrier in each case, is brought into swing-damping contact with the crane carriage. According to a further form of embodiment the position of the spreader in relation to the standing position to be approached is ascertained by a remote recognition system fitted on the spreader.

3 Claims, 6 Drawing Sheets

CONTAINER CRANE INSTALLATION

This application is a division of application Ser. No. 07/349,248, filed on May 8, 1989, now U.S. Pat. No. 5,048,703.

BACKGROUND OF THE INVENTION

The invention relates to a container crane installation which is intended to transfer containers between different standing positions, especially between standing positions in the hull or on the deck of a container transport ship for the one part and standing positions on the quay or on transport means driving on the quay for the other part, and which is constructed for this purpose with a hoist cable carrier drivable along at least one horizontal axis by means of a travel mechanism and a container reception frame, hereinafter called spreader, suspended on hoist cables of the hoist cable carrier and displaceable vertically by means of a cable hoist mechanism.

With increasing size of container ships the crane installations used for loading and unloading these ships also become ever larger. The crane driver thus necessarily comes to an increasing distance from the critical point, that is the entry of the spreader or container into the standing position in each case, that is into the ship's compartment. His angle of view becomes ever more unfavourable, because he must look nearly vertically downwards, whereby he loses the perspective view. He therefore does not know how far the container or spreader is still from the guide arranged at the beginning of the compartment. The difficulties are increased by the fact that the spreader hanging on the hoist cable is subject to unavoidable swinging movement and frequently also deflections by wind influences. Only very skilled crane drivers can think so far in advance that they can master the problem of swing.

OBJECT OF THE INVENTION

The invention is based upon the problem of indicating a crane installation which facilitates for the crane driver the driving of the spreaders or containers into the standing position in each case, that is especially into a ship's compartment.

SUMMARY OF THE INVENTION

To solve this problem it is proposed that co-operating swing-damping media, which come into mutual engagement on approach of the spreader to the hoist cable carrier, are fitted on the hoist cable carrier and on the spreader Such a development of the crane installation permits a working method of the kind where before the commencement of a lowering movement of the spreader the hoist cable carrier is brought into that position which corresponds to the standing position to be approached in each case, and where swinging movements of the spreader are suppressed before the beginning of the lowering movement. With this method the hoist cable carrier is set at the beginning of the lowering movement so that under ideal lowering conditions the spreader and container arrive in correct position in the standing place, that is especially in the entry of the ship's compartment. Since moreover at the beginning of the lowering operation the swinging has been suppressed by the engagement of the swing damping means on the spreader and hoist cable carrier, it can be expected that no substantial swinging movements will occur during the lowering action. The spreader and container are then subject only to any wind pressure. However the crane driver is already largely relieved if he has only still to give attention to displacements due to wind pressure.

According to a further development of the invention it is proposed that a stepping control system is provided for the driving mechanism for the execution of travel steps along the horizontal axis of the hoist cable carrier according to the space co-ordinate difference of standing positions to be approached in succession, while the step corresponding to the space co-ordinate difference in each case takes place in each case from that position of the hoist cable carrier which in the execution of a previous step, taking consideration of the wind conditions then prevailing and assumed as remaining the same, has resulted in a correct spreader position for the standing position. This further development is based upon the consideration that the wind conditions as a rule experience no substantial changes between two successive lowering operations. Thus if the crane driver has for a first time controlled the container or spreader into the standing position, possibly by trying out several times, it is determined what offsetting the wind prevailing in each case causes between the spreader and the hoist cable carrier. Now it is possible to store the standing position of the hoist cable carrier which has led in a first lowering operation to the positionally correct position of the spreader and container in relation to the standing position, and the following steps which take place from this position can be effected with a step length corresponding to the co-ordinate difference between the standing positions to be approached in the first and in the second lowering operations. If then the wind conditions have remained the same, the spreader necessarily also arrives at the new standing position in correct position in the second lowering too. Even if the wind conditions change somewhat between two lowering operations, the correction work to be executed by the crane driver remains relatively slight A further solution with the aim of facilitating the work of the crane driver consists in that for the recognition of standing position limits and/or obstacles in the path of the spreader, a remote recognition system is fitted having a pulsated directional beam transmitter for the emission of a radiation reflectable on the standing position limit or the obstacle, a reflection beam receiver and a transit-time measuring device for the ascertaining of information as to at least one space co-ordinate of the standing position limit or the obstacle, this information serving for the control of the hoist mechanism, the travel mechanism and/or of a spreader turning mechanism.

When there is mention here of directional beam transmitters, one is thinking especially of the emission of electro-magnetic radiation and then again especially of impulse lasers, which merit preference because they permit an especially narrow beam limitation. In addition, especially for simpler situations, other electro-magnetic radiations and under some circumstances even acoustic waves, especially ultra-sonic waves, are also conceivable.

Irrespective of which recognition task is allocated to the remote recognition system, the following problem exists. The remote recognition system cannot be fitted on the spreader on its under side, since the container is coupled there. This means that the remote recognition system must be fitted on the spreader outside the outline of the containers to be expected. In order now to permit the remote recognition system an angle of view not limited by the container in each case, the remote recognition system must be fitted outside the outline of the container and thus of the spreader. This however leads, especially in the loading of ship compartments which are closely adapted to the container outline in each case, to the difficulty that a remote recognition system protruding beyond the spreader outline comes, in entry into the ship's compartment, into collision with the lateral limits thereof. It is therefore proposed that the remote recognition system is displaceable on the spreader between a recognition position outside the container outline and a retracted position which permits the entry of the spreader and container into a standing position limitation, for example a container reception shaft of a ship.

One of the problems which arise for the crane driver is, on approach of the container or spreader to the upper end of the ship's compartment or on approach to the floor of the ship's compartment, or to the upper side of a container already deposited there, to reduce the speed of lowering in order to permit gentle collision or setting down. This problem becomes ever greater with increasing lowering speeds. It cannot even be solved in that one works at great safety intervals with the switching-on of a creeping speed, because thus the transloading performance is again reduced. It is therefore further proposed that the remote recognition system serves for the recognition of the spreader or container vertical distance from the setting-down surface at the standing position in each case and/or for the recognition of the distance of the spreader or container from the upper end of a standing position limitation formed as shaft. Thus a signal is available which can be used for the direct controlling of the hoist mechanism. It is however also conceivable that the result of the interval measurement is displayed on a display appliance made available to the crane driver, so that the crane driver can actuate the hoist mechanism accordingly by hand. It should be remarked here that for the display of the height of the spreader in each case to the crane driver, so-called depth measuring devices are already in use which indicate the height of the spreader as a function of the hauling-in condition of the hoist cable. Thus however only the height of the spreader in relation to the hoist cable carrier can be ascertained, but not the primarily interesting height of the spreader in relation to the upper end of the ship's compartment or in relation to the floor of the ship's compartment or the container already present. On the other hand with depth measuring devices of the mentioned kind it is possible to carry out height measurements even if the container is already situated in the compartment, that if for the reason described further above the remote recognition systems are in their retracted position and therefore can no longer be used for the measurement of vertical interval. It is therefore further proposed that in the case of presence of a distance-measuring appliance actuated by the hauling-in condition of a hoist cable, hereinafter called depth-measuring appliance, this can be calibrated by the result of the distance measurement of the remote recognition system.

In the case of this configuration something like the following possibility is available. As long as the spreader is situated high above the compartment and the remote recognition system is situated in its extended operational position, one measures the distance of the spreader from the upper end of the compartment and from the floor of the standing place in each case, whether it is the floor of the compartment or the upper side of a container already standing there. Then one calibrates the depth-measuring device so that this indicates the distance values at the measurement moment as ascertained by the remote recognition system. After this calibration is once effected, the depth measuring system continues to indicate the actual distance values of the container or spreader from the critical height positions.

In accordance with the invention the work of the crane driver can further be facilitated in that a scanner drive is allocated to the directional beam transmitter and that this scanner drive delivers a position co-ordinate as to the momentary position of the directional beam to a computer which at the same time receives transit time and thus distance information, this computer delivering, from this information, information as to the position of the spreader or container in the horizontal direction in relation to the profile of the limits of the standing position, which can be used for the control of the travel mechanism drive. Here the information gained from the computer can serve directly for the control of the travel mechanism drive. The hoist cable carrier is then positively controlled, on the basis of the information obtained from the computer, so that the spreader or container arrives exactly on the standing position, that is especially in the shaft of the ship's compartment. This control action is carried out in a manner in which the correction movement of the hoist cable carrier is initiated and braked with minimum possible accelerations, in order for the correction movement not to cause swinging movements which then would have to be corrected again and possibly could no longer be corrected on account of the relatively short available correction times. The system used according to the invention for remote recognition here permits the use of various measures of regulation technique. Thus it may also be possible to determine. by a simple differentiating circuit, the horizontal speed of the spreader in relation to the standing position, that is especially a shaft entry, and to correct the control command in advance, taking consideration of this speed information.

Alternatively it is again also possible here that the information gained from the computer serves for the control of a reproduction apparatus at the crane driver's location, displaying the position of the spreader or container in relation to the profile of the standing position limitation. Here by way of example it is possible to represent the profile of the compartment entry and the container with its outline or at least a center point on an image screen. If the container outline and the compartment outline are represented, the crane driver can on the basis of this representation carry out all translational movements in the horizontal direction in aimed manner, that is for example a movement of the hoist cable carrier along a crane jib (1st co-ordinate axis) or a movement of the crane along a crane rail (2nd co-ordinate axis). Furthermore with such a representation the crane driver can also carry out rotational corrections, provided that there is a rotation facility on the spreader or on the hoist cable carrier. The indications as to height, mentioned further above, can also be focussed directly into the image screen which is showing the profile of the compartment and the container. Finally the hoisting speed and/or the travelling speed in each case can also be focussed into the image screen.

For the recognition of an edge of the compartment profile it is also to be mentioned that this is ascertained by the remote recognition system when a transit time leap occurs in the course of scanning. At this moment then the absolute value of the transit time is measured before and after the leap and can be graphically represented.

For scanning it is advisable to cause the directional beam to pivot. This can take place for example in that the scanner drive serves for the pivoting of a deflecting mirror lying in the directional beam path. The scanning movement can take place in one plane. In this case two remote recognition systems are needed for the representation of one profile corner of the standing position.

It is however also possible to carry out a superimposed scanning movement in two mutually perpendicular planes (corresponds to a circulating movement of the directional beam), so that a specific corner of the profile can be displayed with one remote recognition system. In order to ascertain the entire profile of a standing position at least two corners must be represented.

The installation can further be refined in that for the recognition of the spreader position in relation to the hoist cable carrier a position recognition system is provided having a pulsated directional beam transmitter for the emission of radiation reflectable on the hoist cable carrier, a reflection beam receiver and a transit time measuring device for the ascertainment of information on at least one space co-ordinate of the spreader position in relation to the hoist cable carrier, this space information serving additionally for the control of the hoist mechanism or the propulsion mechanism. In this way it is possible for example to ascertain the wind influence namely from the position of the spreader in each case in relation to the hoist cable carrier. If the wind influence is known, this can be taken into consideration fundamentally in advance in controlling to a specific position, so that the correction, which is gained from the comparison of container position and profile of the standing position, must take consideration now only of other influences, for example swinging. Furthermore by the position recognition system it is possible to produce information as to the horizontal relative speed between spreader and hoist cable carrier. Then by subtractive superimposition with the horizontal speed of movement of the spreader in relation to the profile of the standing position it is possible to ascertain the rolling movement of the ship too, and thus to feed this rolling movement as further control value into the computer, always with the aim of keeping the correction movement of the hoist cable carrier, especially in the final phase of approach to the critical point in each case, as small as possible, and to carry it out with minimum possible accelerations and speeds.

BRIEF DESCRIPTION OF THE DRAWINGS

The accompanying Figures explain the invention by reference to examples of embodiment, wherein.

DESCRIPTION OF THE PREFERRED EMBODIMENTS

Figure 1:
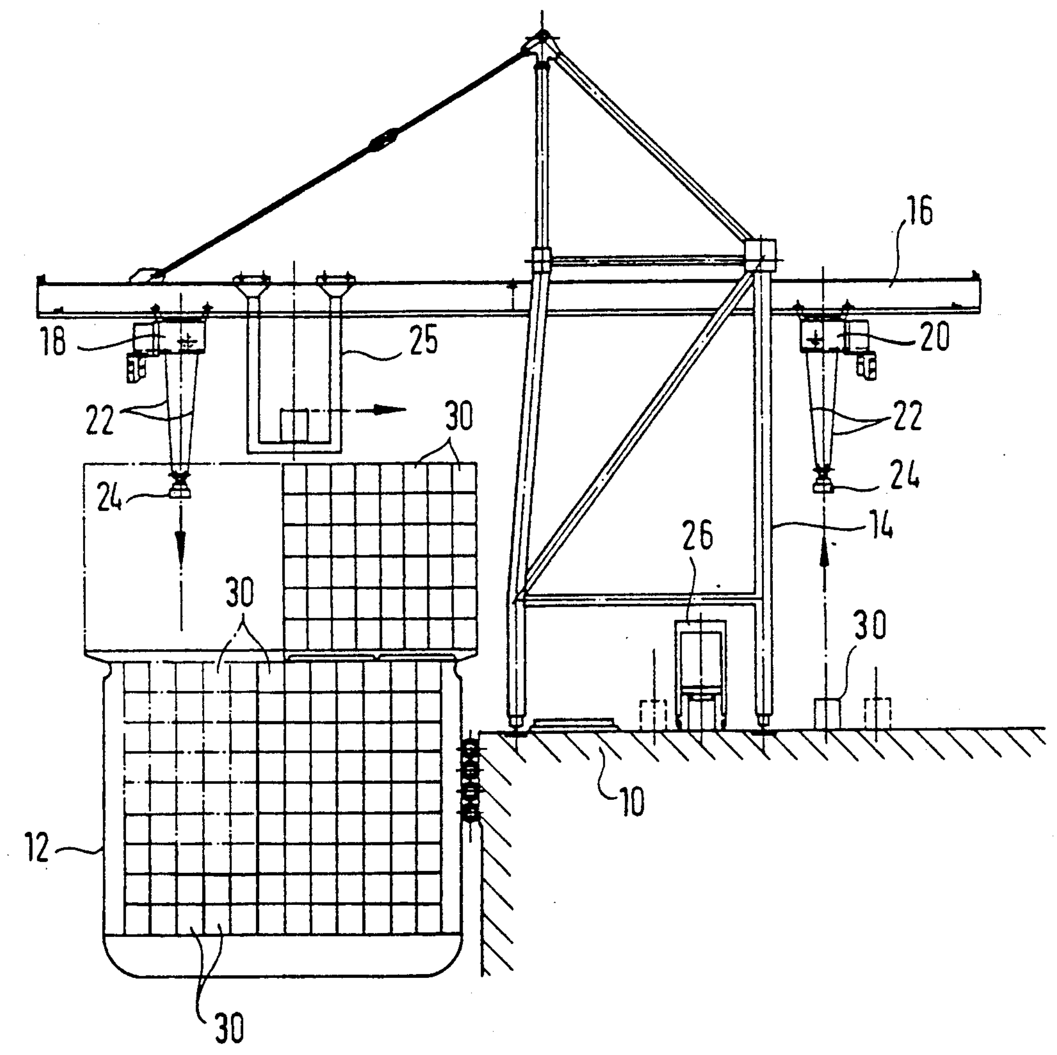
FIG. 1 represents a crane installation in the charging of a ship lying at a quay.

In FIG. 1 there is seen a quay 10 of a harbour installation against which a container ship 12 is lying. On the quay stands a container crane 14, which is mobile on rails parallel to the longitudinal direction of the quay, that is perpendicularly of the plane of the drawing. The crane 14 carries a crane bridge 16. Two crane carriages 18 and 20, which are also to be understood as hoist cable carriers, are mobile on this crane bridge 16. A spreader 24 formed for the releasable reception of containers hangs through hoist cables 22 on each of the crane carriages. The carriage 18 is intended for taking containers out of the ship 12 and for inserting containers into the ship 12. A transfer carriage 25 is mobile on the crane bridge 16 beside the carriages 18 and 20 on a separate pair of rails, and can be brought into coincidence in the plane of the drawing with each of the crane carriages 18 and 20.

The crane carriage 18 with the pertinent spreader takes over the transport from the transfer carriage 25 to the ship and back. The crane carriage 20 with its pertinent spreader takes over transport of the containers between the transfer carriage 25 and the quay installation 10 or the transport media 26 which are mobile on the quay installation 10. The transfer carriage 25 takes over transport along the bridge beam 16 between the two crane carriages 18 and 20.

Figure 2:
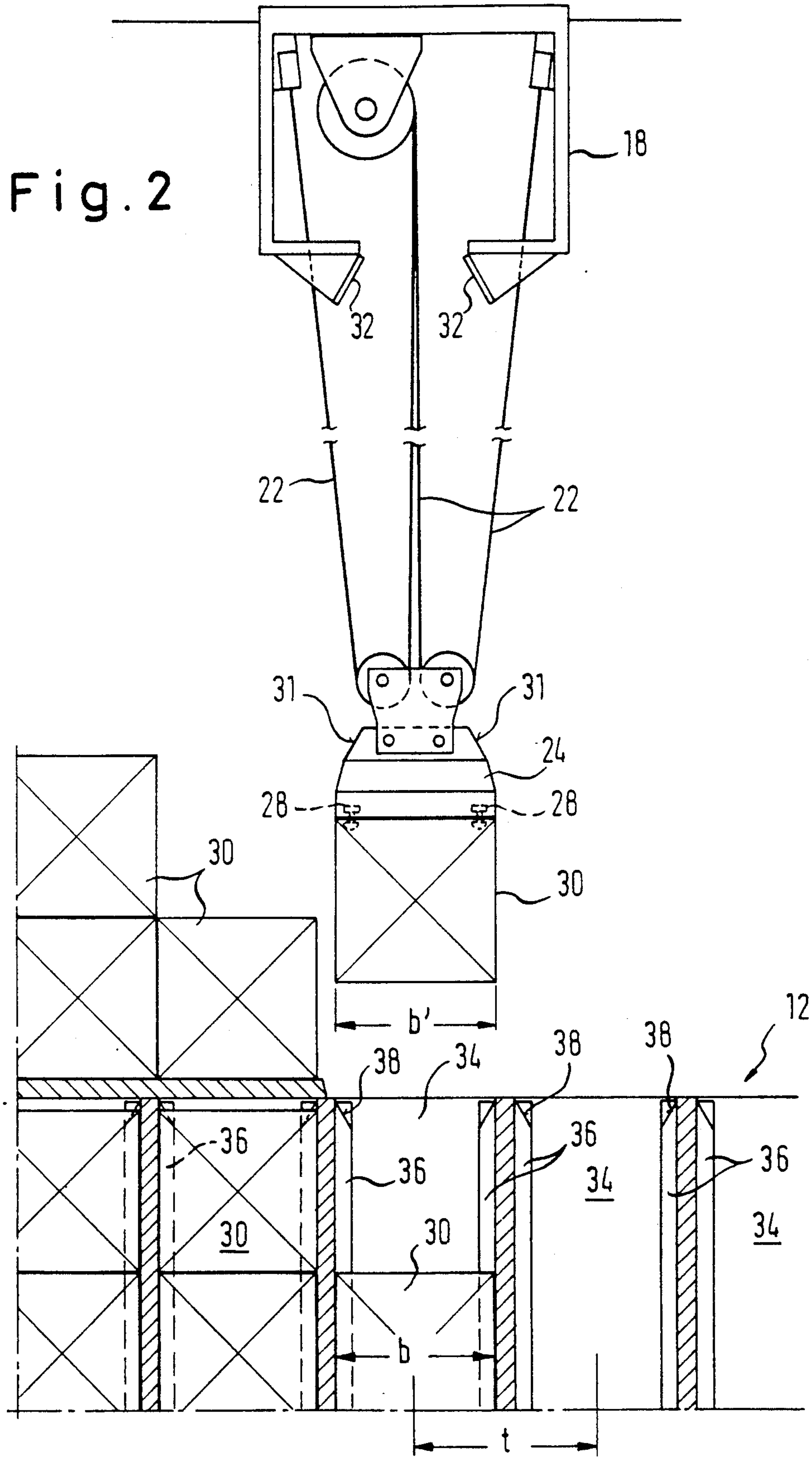
FIG. 2 shows an enlarged detail representation of FIG. 1.

In FIG. 2 the lower part of the crane carriage 18 is seen in enlarged representation. The spreader 24 is suspended through the hoist cables 22 on this carriage 18. This spreader 24 comprises couplings 28 for the attachment of a container 30. On the spreader 24 there are provided wedge-shaped swing-damping faces 31 which come into engagement, when the spreader is fully lifted, with matching swing-damping faces 32 on the crane carriage 18. FIG. 2 further discloses that the container 30 is to be inserted into a container reception shaft 34 of a ship compartment. This container reception shaft corresponds in its width b to the width b′ of the container. In length the container reception shaft 34 is divided by profile ribs 36, so that a container can be inserted between each two successive rib pairs 36. A plurality of containers 30 is situated one above another according to the height of the container reception shaft.

When a container 30 is to be introduced into a container reception shaft 34 the crane carriage 18 drives to the container reception shaft concerned. In driving to a container reception shaft offset in relation to the plane of the drawing, the whole crane 14 is driven perpendicularly of the plane of the drawing in FIG. 1.

When a container is to be lowered into a specific container reception shaft, firstly the crane carriage 18 is brought into that position which corresponds to this container reception shaft. During this driving movement hoisting movements can take place in superimposed manner, so that the driving and hoisting times are not necessarily superimposed additively, but overlap. Now however it is essential that at the beginning of the lowering of the spreader 24 in the direction towards the container reception shaft, swinging movements are suppressed by engagement of the swing-damping faces 31 of the spreader and 32 of the crane carriage 18. Thus the lowering movement of the spreader 24 may begin only after the crane carriage 18 has reached its position corresponding to the shaft to be approached in each case. Or in other words, after termination of the driving movement of the crane carriage 18 contact of the swing-damping faces 31 with the swing-damping faces 32 must have taken place. Then in the subsequent lowering of the spreader no swinging of the spreader 24, or at most slight swinging, occurs and there is a good prospect that the container 30 passes the upper edges of the container reception shaft 34 without collision.

It is to be noted that the representation in FIG. 2 is not accurate to scale, in reality the hoist cable lengths of the hoist cables 22 are very much greater. One reckons with free swing lengths between 20 and 25 m. before the container reaches the upper end of the container reception shaft 34.

It is also seen from FIG. 2 that different container reception shafts 34 are arranged side by side, which must be approached in succession. Hitherto wind influences were not taken into consideration. With the great free swing lengths however these wind influences are not negligible, especially not if a container is suspended in the lowering operation on the spreader 24 and offers a relatively large action area to the wind. Now experience has shown that between two successive lowering operations the wind conditions vary abruptly only in exceptional cases. Therefore, if after charging of the one container reception shaft 34 the other container reception shaft 34 is to be charged, the crane carriage 18 will be driven in accordance with the spacing interval t between the successive container reception shafts 34, namely starting from that position of the crane carriage 18 which had led, under the prevailing wind conditions assumed as constant, to an exact alignment of the container 30 with the upper edge of the first container reception shaft 34. In this way there is a chance that after driving of the crane carriage 18 by the spacing dimension t the container 30 will again find its way exactly into the new container reception shaft 34 Here it should also be remarked that guide-in faces are provided on the upper ends of the container reception shafts, for which faces however only restricted space is available.

Figure 1A:
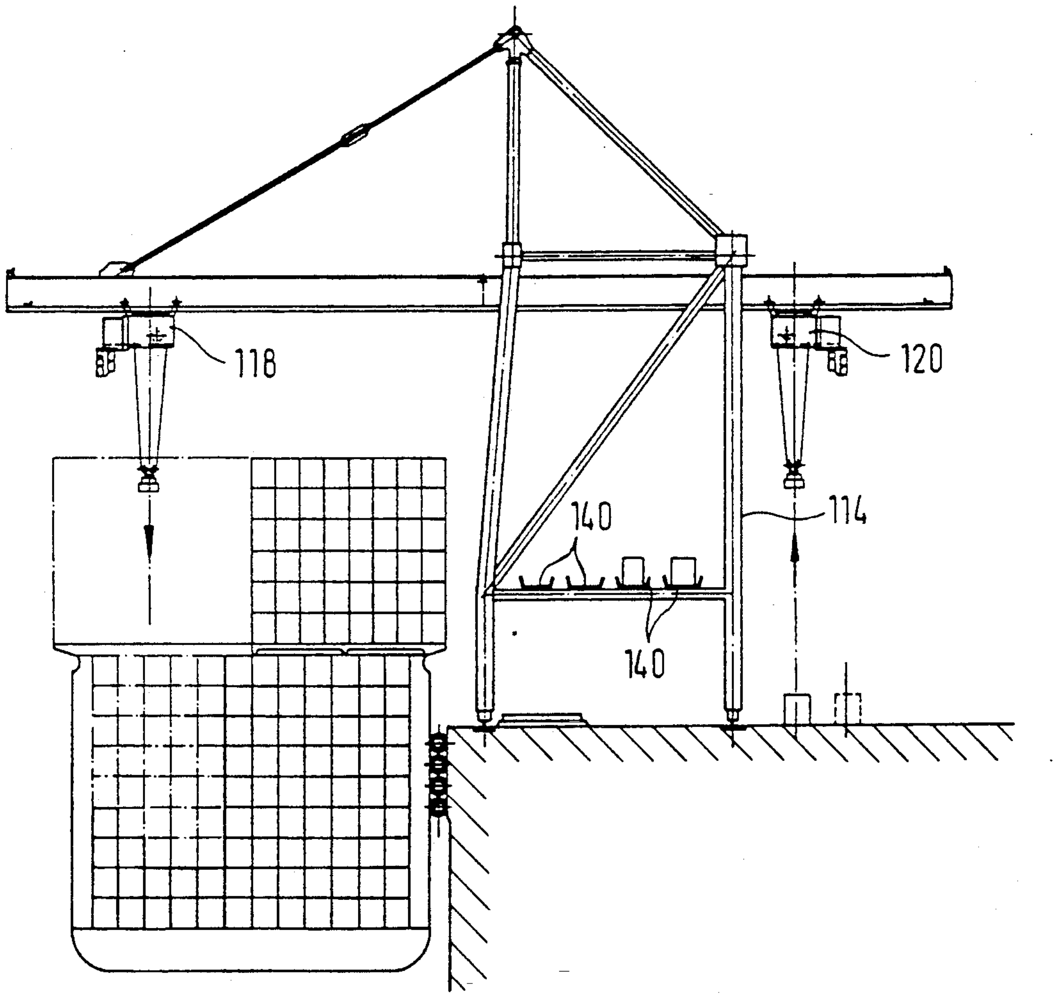
FIG. 1*a* shows a modification of FIG. 1.

FIG. 1*a* differs from FIG. 1 only in that the transfer carriage 25 has been omitted. The two crane carriages 118 and 120 here take over the container transport from the ship to container reception platforms 140 which are fitted on the crane framework 114 in the form of a buffer store. The crane carriage 120 effects the container transport between the platforms 140 and the depositing places on the quay terrain. In this form of embodiment the method as described above can again be used. It is also possible to modify this method to the effect that the crane driver does not necessarily have to hoist up the spreader to abutment on the crane carriage at every transfer operation, but only when in fact swinging movements occur which cannot be mastered. Therefore the possibility entirely exists, under favourable conditions, even of driving a container by the shortest route from a standing place A to a standing place B, possibly with combination of driving movement and raising or lowering movements.

Figure 3:
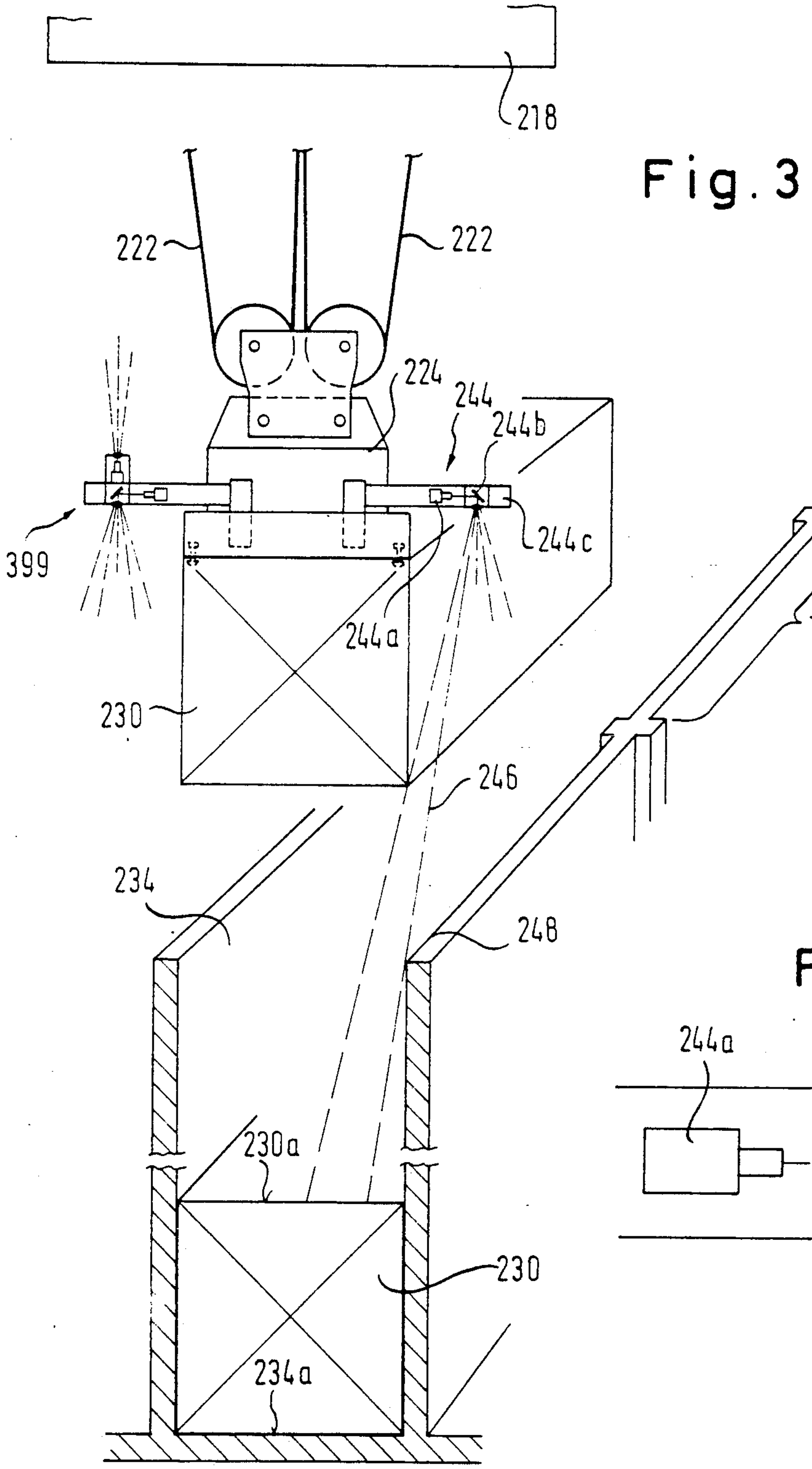
FIG. 3 shows a spreader with remote recognition system.

In FIG. 3 there is again seen a container 230 on a spreader 224 which is suspended through hoist cables 222 on the crane carriage 218. Again a shaft 234 is to be charged or discharged, as represented in FIG. 3. Now remote recognition systems 244 are arranged on the spreader 224. Each of these remote recognition systems 244 comprises a pulse laser 244*a*, a deflector mirror 244*b* and a reflection beam receiver 244*c*.

Figure 4:
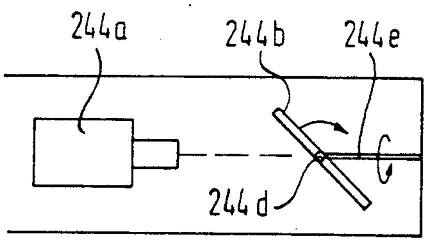
FIG. 4 shows a mirror arrangement for three-dimensional scanning.

In FIG. 4 it is illustrated that the deflector mirror 244*b* is pivoted about two mutually perpendicular axes 244*d* and 244*e* of rotation by pivoting motors (not shown). The laser pulses fall in the form of a directional beam 246 upon the defining edges 248 of the container reception shaft 234, upon the upper side 230*a* of a container 230 already situated in the shaft 234 and, in the absence of such a container, upon the floor 234*a* of the container reception shaft 234. At these impact points the laser pulses are reflected and then strike upon the reflection beam receiver 244*c*. The distance travelled in each case by the laser pulse can be measured by a transit time measurement. In this way the vertical distance of the spreader 224 from the surfaces 248, 230*a* and 234*a* can be determined.

Furthermore as a result of the pivoting movement of the deflector mirror 244*b* the profile of the upper edge 248 of the container reception shaft 234 can be explored. If a transit time leap occurs, this means that the edge between the upper end face 248 and the shaft 234 is overrun. At this moment the shorter transit time in each case and thus the shorter transit distance in each case corresponding to the distance between the remote recognition system 244 and the surface 248 must be retained. At the same time the angle position of the deflector mirror 244*b* must be retained at this moment. From this angle information and the transit time information then a computer can determine the position of the spreader 224 in relation to the upper defining profile 248 of the container reception shaft 234.

Figure 5:
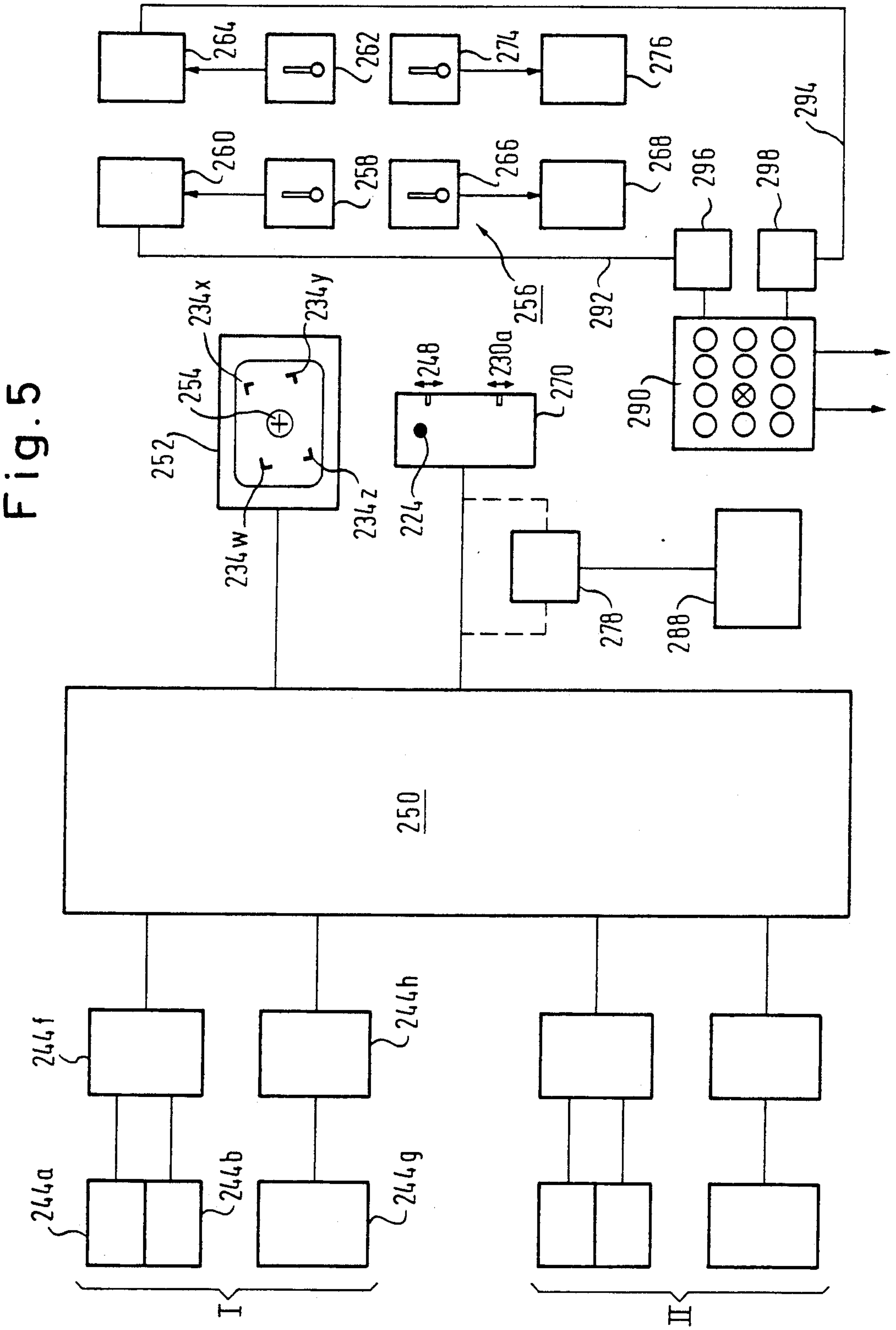
FIG. 5 shows the block diagram of the remote recognition system in image screen representation of the container deviations and FIG. 6 shows the block diagram of the remote recognition system in the case of direct actuation of hoist cable mechanism and propulsion mechanism

In FIG. 5 there are again seen the pulse laser 244*a*, the reflection beam receiver 244*b* and a transit time meter 244*f*. The transit time meter 244*f* delivers transit time information and thus distance information to a computer 250. Furthermore in FIG. 5 there is seen a scanner drive 244*g* for the deflector mirror 244*b*. With this scanner drive 244*g* there is associated an angle meter 244*h* which delivers information as to the angle position of the mirror 244*b* in each case to the computer 250. At the moment when a transit time leap occurs, transit time information and angle information are fed to the computer 250 which then determines the space co-ordinate of the overrun edge in each case. From a plurality of such space co-ordinates the profile in one corner can be determined. In FIG. 5 two remote recognition systems I and II are shown, so that two corners of the profile of the container reception shaft can be ascertained. This fundamentally suffices to determine the relative location of the spreader or container in relation to the profile of the container reception shaft. By way of example a mote recognition system is allocated to each of two mutually diagonally opposite corners.

At the exit of the computer 250 there lies an image screen 252 on which four corners of the profile of the container reception shaft are reproduced. These four corners are designated by 234*w*, 234*x*, 234*y* and 234*z*. At the same time the center point of the spreader is seen, which is indicated by cross-threads 254. From the translational displacements of the corners 234*w* to 234*z* it is now possible to ascertain which correction movements must be imparted to the crane propulsion mechanism and to the crane carriage propulsion mechanism Beside the image screen 252 the crane driver has a switchboard 256 before him, on which there are manual actuation elements for the various driving and hoisting operations, namely a manual actuation element 258 which controls a crane drive mechanism 260, namely a drive mechanism for the movement of the crane framework 14 perpendicularly of the plane of FIG. 1. There is also seen a manual actuation element 262 for the control of a carriage drive mechanism 264 which ensures the movement of the crane carriage 18 along the crane bridge 16 in FIG. 1. The crane driver actuates the two manual actuation elements and 262 so that the four corners 234*w* to 234*z* come into a position in which the center of the cross-threads 254 coincides with the center of the four corners 234*w* to 234*z*.

In addition a manual actuating element 266 is provided which controls a rotating mechanism 268 of the crane carriage so that the container can also be turned into the correct angular position in relation to the entry of the container reception shaft. The rotating movement can also be followed on the image screen 252. The correct angular position is reached when the two corners 234*w* and 234*x* appear with their line of connection horizontally on the image screen.

The computer 250 delivers a further output lying on a height indicator 270. In this height indicator the height of the spreader 224 in relation to the surfaces 248 and 230*a* is displayed, so that the crane driver knows when, on approach to these surfaces, he has to reduce the lowering speed to creeping speed by actuating of an actuating element 274. The manual actuating element 274 is connected to the cable hoist mechanism 276.

Of course it is also possible to focus the display marks 224, 248 and 230*a* into the image screen 252 or to let them appear there as numerical values.

The possibility should also be mentioned of combining the height indication with a usual depth measuring appliance 278 which is actuated from a hoist cable drum 288. Here the following special circumstance exists:

As may be seen from FIG. 3, the remote recognition systems 244 protrude beyond the outline of the spreader 224 and the outline of the container 230. Before the container is lowered into the container reception shaft 234, the remote recognition systems 244 must be retracted out of the position as represented in FIG. 3 into a position in which they lie within the outline of the spreader, so that they do not come into collision with the edges 248. Then however there is no longer any possibility of ascertaining the distance of the container 230 from the surface 230*a* of a further container 230 already lowered into the shaft, by means of the remote recognition system 244. Now it is possible here to switch over to the depth measuring appliance 278. Immediately before the remote recognition system 244 must be retracted out of the position according to FIG. 3, it transmits the height distance values recognised at this moment to the depth-measuring appliance 278 and effects on this a calibration to the values previously ascertained by laser. This calibration is maintained so that thenceforward the depth-measuring appliance 278 controls the height distance display appliance 270 and this can continue to display the height intervals of the container from the edge 248 of the surface 230*a* or of the surface 234*a*.

The crane driver also has the facility of actuating various knobs on a switchboard 290 which correspond to the container reception shafts present. From each of the crane propulsion mechanism and the carriage propulsion mechanism a feedback lead 292, 294 leads to a store 296 and 298 respectively. The information as to the wind power prevailing at the last lowering operation in each case is stored in these stores so that in the formation of the control signals in the unit 290 for the propulsion mechanisms 260 and 264 the wind power is taken into consideration, that is the displacement by the interval length starts in each case from that location which the crane carriage and the crane framework assumed in the previous lowering operation, if the container arrived exactly in the container reception shaft 234.

Figure 6:
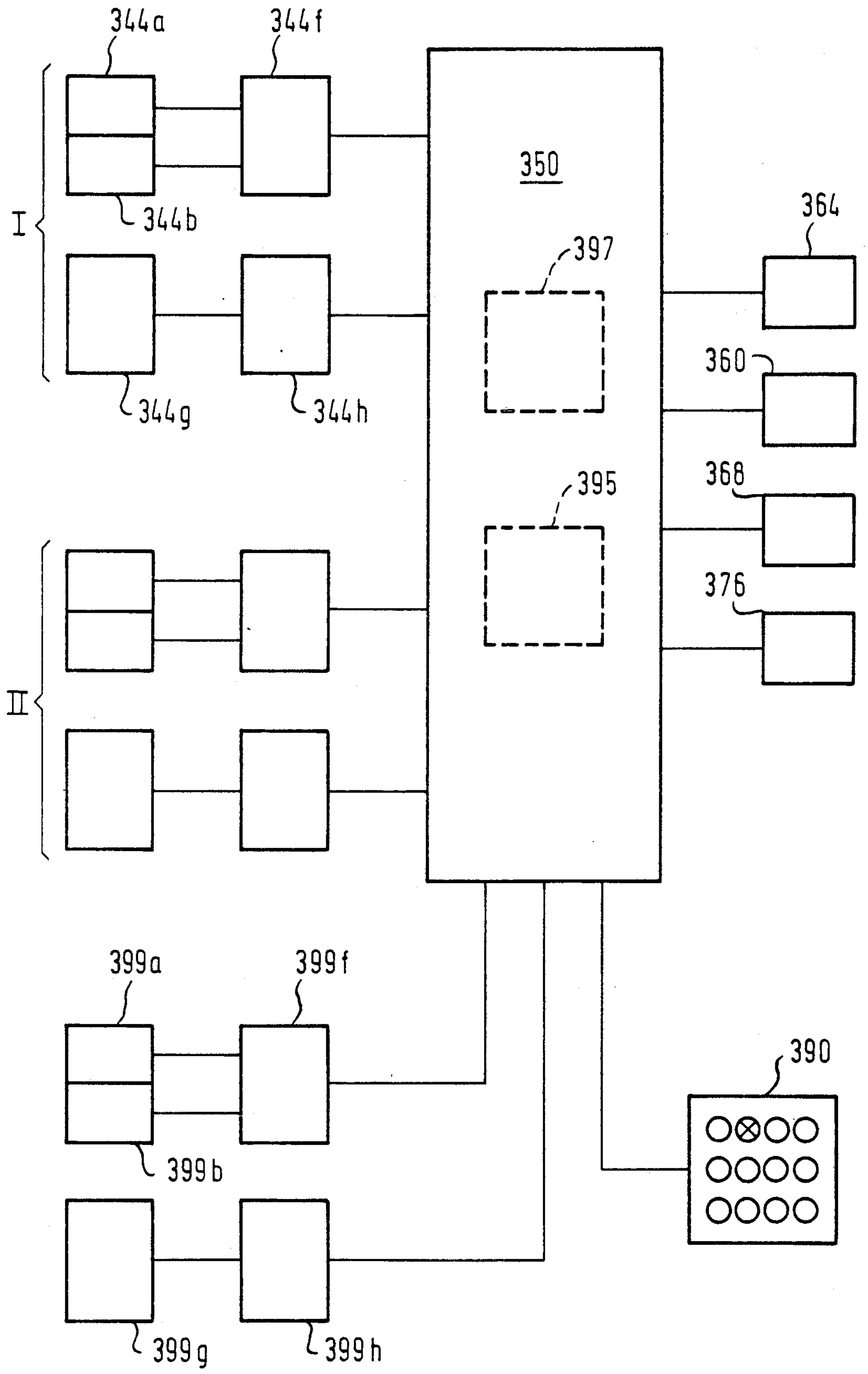

The circuitry according to FIG. 6 largely correspond to that according to FIG. 5. Analogous parts are provided with the same references as in FIG. 5, each increased by the number 100.

Firstly reference should be made again to FIG. 3. There beside the remote recognition systems 244 a position recognition system 399 is seen which is arranged in exactly the same way on a carrier movable in relation to the spreader as the remote recognition systems 244, and is intended to ascertain the position of the spreader 224 in relation to the crane carriage 218. According to FIG. 6 this position recognition system is composed of a directional beam transmitter 399*a*, a reflection beam receiver 399*b*, a scanner drive 399*g* and an angle meter 399*h*, also a transit time meter 399*f*. The output signals of the transit time meter 399*f* and the angle meter 399*h* additionally are connected to the computer 350. The output signals of the computer 350 are connected directly to the carriage propulsion mechanism 364 to the crane propulsion mechanism 360, to the hoisting mechanism 368 and to the spreader turning mechanism 376. The co-ordinate emitter 390 is likewise connected to the input of the computer 350. In the computer 350 there are enclosed sub-units 397 and 395 which are intended to determine the speed of swing of the spreader and the speed of roll of the ship. The speed of swing is obtained in the sub-unit 397 simply by a differentiation operation, in that the first derivation of the position of the spreader in each case in relation to the entry of the container reception shaft is formed according to time. The speed of roll is obtained in the sub-unit 395 using the signal gained in the sub-unit 397, in that additionally the position of the spreader in relation to the crane carriage is differentiated according to time and then, by subtractive superimposition, the two derivations gained in 397 and 395 are superimposed on one another according to time.

In this way again the wind speed can be ascertained on the basis of the information gained on the position recognition unit 399 and used for controlling. Further the speed of roll of the ship can be taken into consideration in the controlling of the propulsion mechanism.

What is claimed is:

1. A method of operation for a container crane installation for positioning containers (30) in a plurality of standing positions, said standing positions being arranged according to a predetermined system of coordinates when regarded in a vertical direction, wherein said standing positions are predetermined standing positions having at least one predetermined coordinate within said system of coordinates, said container crane installation comprising a hoist cable carrier (18) mobile in a substantially horizontal plane of carrier movement above said standing positions, a spreader (24) being suspended on hoist cables (22) of the hoist cable carrier (18) and vertically displaceable by means of a cable hoist mechanism, said spreader (24) being adapted to hold a respective container (30), said method of operation comprising locating said hoist cable carrier (18) within said carrier movement plane into a first location such that said spreader (24) is lowered in a substantially vertical direction by said cable hoist mechanism and reaches a first determined standing position, storing information on the coordinate of said first location of said hoist cable carrier (18) with respect to said predetermined system of coordinates, selecting a second determined standing position for said spreader (24), moving said hoist cable carrier (18) to a second location within said carrier movement plane, wherein said second location is calculated by addition of said stored at least one coordinate of said first location and the difference of respective coordinates of said first determined standing position and said second determined standing position, and lowering said spreader (24) toward said second determined standing position, the actual location of said hoist cable carrier (18) with respect to said second location being corrected such that said spreader (24) reaches said second determined standing position during substantially vertical lowering by said cable hoist mechanism, said correction being performed based on information received during said substantially vertical lowering of the spreader from a computerized remote recognition system (244) detecting horizontal displacements of the spreader (24) with respect to said second determined standing position, said information being used for controlling movement of said hoist cable carrier (18) in said substantially horizontal plane, to compensate for said horizontal displacements so that said spreader (24) reaches said second determined standing position in the course of said substantially vertical lowering, said standing positions being laterally confined by substantially vertically extending confining means (234) having an upper end (248), said remote recognition system (244) observing without contact said upper end (248) of said substantially vertically extending confining means (234) from an observing position above said upper end and detecting said horizontal displacements before said spreader (24) arrives at a level spaced above said upper end (248) for a distance corresponding to the height of a container during said substantially vertical lowering of the spreader (24) such that said displacements are compensated for before said spreader (24) arrives at said level, compensating movements of said hoist cable carrier (18) being minimized during a final phase of vertical approach of said spreader (24) toward said level.

2. A method of operation as set forth in claim 1, said information being used for automatic control of driving means (260, 264) moving said spreader (24) in said substantially horizontal plane in order to compensate for said displacements.

3. A method operation as set forth in claim 1, said information being used for controlling an image screen (252) showing the relative position of a respective spreader (24) being lowered in substantially vertical direction and a respective determined standing position reached by said spreader (24) in a horizontal plane, manual actuation elements (258, 262) being provided in proximity of said image screen (252) for controlling movement of said spreader (24) in said horizontal plane by an operator observing said image screen (252) in order to compensate for said displacements.

* * * * *

UNITED STATES PATENT AND TRADEMARK OFFICE

CERTIFICATE OF CORRECTION

PATENT NO. : 5,152,408

DATED : October 6, 1992

INVENTOR(S) : Hans Tax and Klaus Hösler

It is certified that error appears in the above-identified patent and that said Letters Patent is hereby corrected as shown below:

Col. 9, line 11, "and 262" should read --258 and 262--.

Col. 12, line 22, "method" should read --method of--.

Signed and Sealed this

Eleventh Day of January, 1994

Attest:

BRUCE LEHMAN

Attesting Officer

Commissioner of Patents and Trademarks

UNITED STATES PATENT AND TRADEMARK OFFICE

CERTIFICATE OF CORRECTION

PATENT NO. : 5,152,408

DATED : October 6, 1992

INVENTOR(S) : Hans Tax and Klaus Hösler

It is certified that error appears in the above-identified patent and that said Letters Patent is hereby corrected as shown below:

On title page, above item [21] Appl. No.: 731,442
add --[73] Assignee: Tax Ingenieurgesellschaft MbH, Munich, Federal Republic of Germany.--

Signed and Sealed this

First Day of March, 1994

Attest:

Bruce Lehman

BRUCE LEHMAN

Attesting Officer

Commissioner of Patents and Trademarks